(No Model.)
B. A. WHITE.
AIR RESERVOIR FOR AIR BRAKES.
No. 538,002. Patented Apr. 23, 1895.
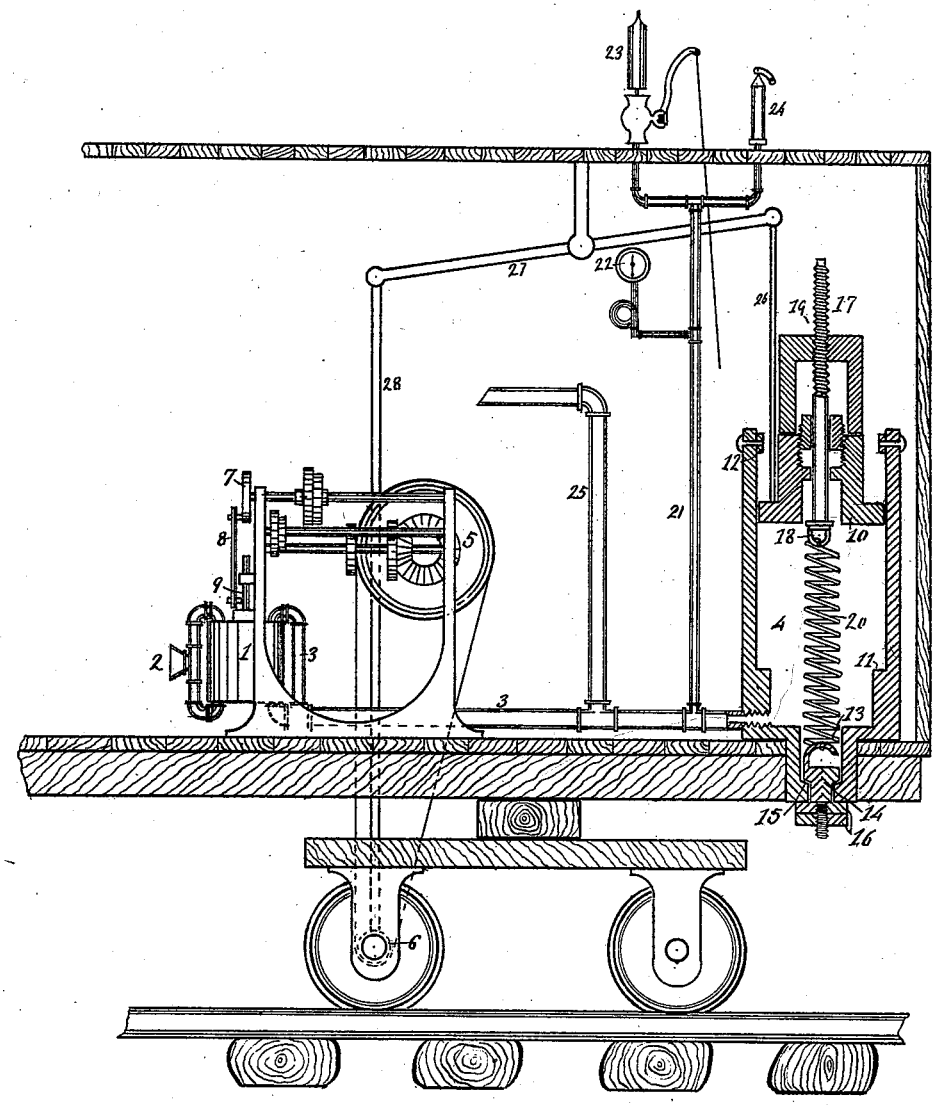
WITNESSES:
A. B. Howland.
F. B. Howland.
Byron A. White. INVENTOR
BY
Joseph Smith
ATTORNEY.

UNITED STATES PATENT OFFICE.

BYRON A. WHITE, OF ELDRED, PENNSYLVANIA, ASSIGNOR OF FIVE-EIGHTHS TO L. B. WOOD, OF SAME PLACE.

AIR-RESERVOIR FOR AIR-BRAKES.

SPECIFICATION forming part of Letters Patent No. 538,002, dated April 23, 1895.

Application filed January 28, 1895. Serial No. 536,444. (No model.)

*To all whom it may concern:*

Be it known that I, BYRON A. WHITE, a citizen of the United States, and a resident of Eldred township, in the county of Warren and State of Pennsylvania, have invented a new and useful Improvement in Air-Reservoirs for Air-Brakes, of which the following is a specification.

My invention relates to the system of air brakes in use on freight or passenger trains, more especially to long freight trains, and consists of an auxiliary air reservoir, placed in the caboose or any other car in the train, the air being compressed therein by an air pump operated by mechanism driven by the axle of the truck of the car. I also claim an improvement in the construction of the reservoir.

It is well known that in the use of air brakes on long freight trains, where the air reservoir on the engine is depended upon entirely to operate the brakes the entire length of the train, the leakage in the long air pipe is often sufficient to render the brakes toward the rear end ineffective, so much so that the engineer loses partially or entirely the control of the train.

My invention is to place in the caboose, or any car at or near the rear end of the train, an auxiliary reservoir, in which the air shall be compressed by an air pump or compressor operated from the axle of the car, and from which the air is discharged into the air pipe of the train by the conductor or brakeman in substantially the same manner as is done on the engine by the engineer. The compressed air also enables the conductor to signal the engineer by a whistle when desired.

My invention is illustrated in the accompanying drawing, which shows the interior of one end of a car with my device placed therein and connected with the running gear, the air cylinder being shown in section so as to exhibit an improvement in construction.

1, is an air pump or compressor, having the receiving air pipe 2, and the discharge pipe 3, leading to the reservoir 4. The air pump is of any ordinary and suitable pattern, and is operated by the pulley 5, which is in turn connected with and driven by a belt (or other gearing) from a pulley 6, on one of the axles of the car.

7, is a crank pulley connected by the pitman 8, with the piston rod 9, of the air pump. Between the pulley 5, and the crank pulley 7, is preferably a variable speed movement, in order that the speed of the pump may be regulated by the person in charge as the speed of the train changes. This is not indispensable, but convenient.

The air reservoir 4, is a cylinder constructed as shown open at one end and having the piston 10, tightly fitting therein, the piston having a range between the shoulder 11, and the ring 12. The cylinder has in the bottom the recess 13, with a hole in the bottom, and the bolt and hook 14, inserted therein, the bolt fitted as a valve upon the valve seat 15, and is held down tight by the nuts 16. The piston 10, is similarly recessed and is provided with the long screw 17, having the swivel eye 18, at the lower end, and the nut 19, on the top of the piston. Between the screw 17 and the bolt 14, is the spiral spring 20, drawing the piston to the bottom of the cylinder as against the compressed air.

21, is a pipe leading from the pipe 3, (or from the reservoir) to a pressure gage 22, whistle 23, and pop valve 24.

25, is a pipe leading to an equalizing valve, (not shown) of any kind in ordinary use, and with the usual connections to the air pipe of the train. These are not shown as they are no part of my invention.

The mechanism for operating the air pump is driven by a connection from one of the axles of the car, where a clutch pulley or any mechanism in common use may be employed which will allow of the machinery being operated or disconnected at will or through the system of rods 26, and 28, and the connecting lever 27, transmitting the motion of the piston 10, to the operating pulley. Also any other system of levers in common use may be employed for transmitting the motion of the piston to the operating pulley. The mechanism of those and of the clutch pulley forming no part of my invention, are not illustrated in the drawing.

The spiral spring 20, in the air cylinder being at tension, drawing the piston downward, the tension may be increased or diminished by turning the nut 19, so as to increase or diminish the pressure of air in the cylinder.

The operation is plain. When the train is at a stand still, and the air cylinder empty, the piston is at the bottom of the cylinder and the clutch engages with the pulley 6, on the axle. On the starting of the train the air pump is set in motion, and the air forced into the cylinder, raises the piston. The spring 20, being adjusted to the proper tension, the piston is raised to the top of the cylinder, when the levers release the clutch and the air pump stops until the air in the cylinder escapes, either by use or leakage, allowing the piston to lower, which again sets the machinery in motion and re-fills the reservoir. When the reservoir is full or partially full, any person in the car can operate the brakes through the equalizer valve in the same manner as the engineer on the engine, or blow the whistle as a signal to the engineer or as an alarm, the spiral spring 20, drawing the piston down and maintaining approximately an equal pressure till the reservoir is exhausted thus making available the full contents of the reservoir.

It is evident that an auxiliary air reservoir, supplied with compressed air as stated and placed in a car at the rear, or any preferred part of the train, with the proper connections to the main air pipe, would be useful as an assistant, or in necessity as the principal agent for setting the brakes, and as furnishing the means for sounding an alarm, or signaling the engineer or train brakeman.

I claim as my invention—

1. In an air brake system for railroad trains; the compressed air cylinder, constructed with one end open, with a piston in said cylinder and with a tension spring between the closed end of the cylinder and the piston; substantially as shown and described and for the purpose herein set forth.

2. In an air brake system; the compressed air cylinder, constructed with one end open, with a piston in said cylinder, and a tension spring between the closed end of the cylinder and the piston, and with a screw through the piston for adjusting the tension of the spring; substantially as shown and described and for the purpose herein set forth.

3. In an air brake system for railroad trains; a compressed air cylinder, placed in the caboose or any car of the train, the cylinder having the bottom closed and the top open, with a piston in said cylinder, a tension spring between the closed end of the cylinder and the piston; an air pump or compressor for compressing the air in the cylinder, said air pump being operated by mechanism driven from an axle of the car, and with a system of levers connecting from the piston of the cylinder to some part of the driving mechanism whereby the pump will be stopped when the cylinder is full; and with a pipe or pipes from the cylinder to the equalizing valve and main air pipe of the train: all operating in combination substantially as shown and described and for the purpose herein set forth.

BYRON A. WHITE.

Witnesses:
DAVID WEED,
A. B. HOWLAND.